Mar. 3, 1925.

W. A. RINGLER

PERPETUAL CALENDAR

Filed Dec. 14, 1922

1,528,633

Patented Mar. 3, 1925.

1,528,633

UNITED STATES PATENT OFFICE.

WILLIAM A. RINGLER, OF PHILADELPHIA, PENNSYLVANIA.

PERPETUAL CALENDAR.

Application filed December 14, 1922. Serial No. 606,776.

*To all whom it may concern:*

Be it known that I, WILLIAM A. RINGLER, a citizen of the United States, residing at Philadelphia, county of Philadelphia, State of Pennsylvania, have invented a new and useful Perpetual Calendar, of which the following is a specification.

The object of this invention is to provide a novel construction and arrangement of a perpetual calendar, in which all of the necessary data can be placed on a single sheet by printing, impressing, or embossing it on both sides of such sheet.

One portion of the sheet forms a month strip and another portion of the sheet forms a numeral sheet on which are indicated different monthly lists, the arrangement of the numbers varying in accordance with the date on which the first of the month should occur.

It further consists of a novel construction of one or more foldable sheets provided with a weakened line to enable a foldable monthly strip and a foldable numeral strip to be formed when the sheet is separated on such weakened line.

Other novel features of construction and advantage will hereinafter more fully appear in the detailed description.

For the purpose of illustrating my invention, I have shown in the accompanying drawing a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a front view of a foldable strip of a perpetual calendar, embodying my invention.

Figure 2 represents a rear view of the construction seen in Figure 1.

Figure 3 represents an end elevation of Figure 4.

Figure 4 represents, in front elevation, a perpetual calendar, embodying my invention.

Similar numerals of reference indicate corresponding parts.

Referring to the drawings,

In carrying out my invention, I use a single sheet or strip of material and print, impress, emboss or otherwise indicate on both sides of the sheet the necessary data for forming the desired combination, with additional spaces which can be employed for advertising or other display matter.

1 designates a sheet of material of any desired character such as, for example, a sheet of paper, one side thereof being shown in Figure 1, and the other side being shown in Figure 2. Intermediate the ends of the sheet the transversely extending weakened line 2 is formed, and, as illustrated, a perforated line is shown. Above the perforated line 2, the sheet is divided into ten folds 3 on one side of the sheet with the lines 4 indicating the place at which the sheet can be folded. On these folds 3 on one side of the sheet are indicated six of the months of the year and the opposite side in a corresponding position the other six months of the year. Three of the folds on each side do not have the month indicated thereon but can have indicated thereon any desired data such as, for example, legal holidays.

One space 7 is formed which can be used for any desired display matter such as, for example, a New Year's card or advertising matter, so that the calendar can be sold as an advertising novelty.

Below the perforated line 2, different monthly arrangements of numerals are shown, as at 5, which are separated by weakened lines 6 on which they can be folded. The only difference in the monthly arrangement is that they vary in accordance with the day of the week on which the first day of the month falls. Each arrangement of numerals has a space 8 in proximity to it on which any desired display or advertising matter can be shown.

When it is desired to assemble the calendar to indicate the proper days of a specified month, the sheet is separated on the line 2. The month strip is folded, and, assuming that November is desired to be shown, and that the first day of the month falls on Saturday, the monthly arrangements are folded so that the arrangement seen at the bottom of Figure 1 can be assembled beneath the word "November" which will be one space above it.

I also indicate in proximity to each month the number of days in the month, so that the person using the calendar will know that there are thirty days in November and not thirty-one, as shown. The manner in which the monthly strip is assembled with respect to the numeral strip 9 will be readily understood by reference to Figure 3, and a detailed description is believed to be unnecessary, the monthly strip being indicated at 10. The different months are separated by the scored lines 4 so that a series of folds are provided to enable the proper month to be rendered visible above the numeral strip.

My present invention can be very economically manufactured and although in practice I preferably use a single sheet of material, it will be apparent that the monthly data can be visibly indicated on one sheet and the numeral data indicated on another sheet, and such construction would be within the spirit and scope of my invention.

It will now be apparent that I have devised a new and useful perpetual calendar which embodies the features of advantage enumerated as desirable in the statement of the invention and the above description, and while I have, in the present instance, shown and described an embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. A perpetual calendar, comprising a single sheet having indicated on one face thereof certain of the months of a year and having on the other face the remaining months of the year, and having indicated on both faces different monthly arrangements of numerals having the first day falling on different days of the week, the sheet having a weakened line between the months and the numeral arrangement to provide for separating the sheet into a month strip and a numeral strip.

2. A perpetual calendar, comprising a single sheet having indicated on one face thereof certain of the months of a year and having on the other face the remaining months of the year, and having indicated on both faces different monthly arrangements of numerals having the first day falling on different days of the week, the sheet having a weakened line between the months and the numeral arrangement to provide for separating the sheet into a month strip and a numeral strip, the months on the month strip being separated by weakened lines, and the different monthly arrangement of numerals being separated by weakened lines.

3. A perpetual calendar, comprising in combination a foldable monthly strip having printed on certain of its folds on one face certain months of the year and having printed on certain folds on its opposite face the remaining months of the year, and a foldable numeral strip having printed on opposite faces monthly arrangements of numbers which differ in accordance with the day of the week on which the first day of the month falls.

4. A perpetual calendar, comprising in combination a foldable monthly strip having printed on certain of its folds on one face certain months of the year and having printed on certain folds on its opposite face the remaining months of the year, and a foldable numeral strip having printed on opposite faces monthly arrangements of numbers which differ in accordance with the day of the week on which the first day of the month falls, and the numeral strip having weakened lines between the monthly arrangements to provide for folding.

WILLIAM A. RINGLER.

Witnesses:
H. S. FAIRBANKS,
C. D. McVAY.